Figure 1:
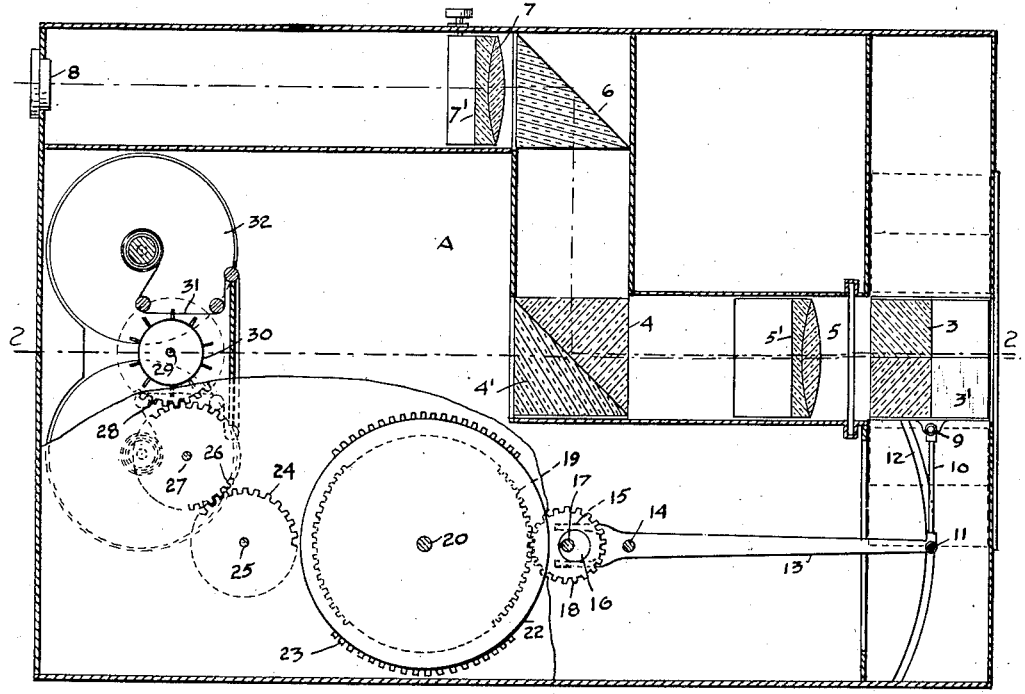

G. GRIFFITH.
OPTICAL DEVICE FOR THE PRODUCTION AND PROJECTION OF STEREOSCOPIC PICTURES.
APPLICATION FILED NOV. 4, 1919.

1,334,532.

Patented Mar. 23, 1920.
2 SHEETS—SHEET 1.

INVENTOR
Graves Griffith.

G. GRIFFITH.
OPTICAL DEVICE FOR THE PRODUCTION AND PROJECTION OF STEREOSCOPIC PICTURES.
APPLICATION FILED NOV. 4, 1919.
1,334,532.
Patented Mar. 23, 1920.
2 SHEETS—SHEET 2.
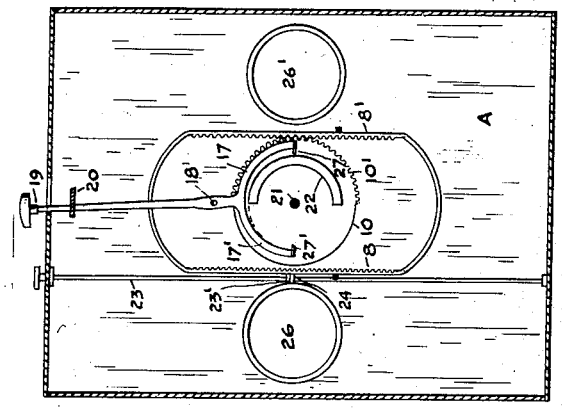
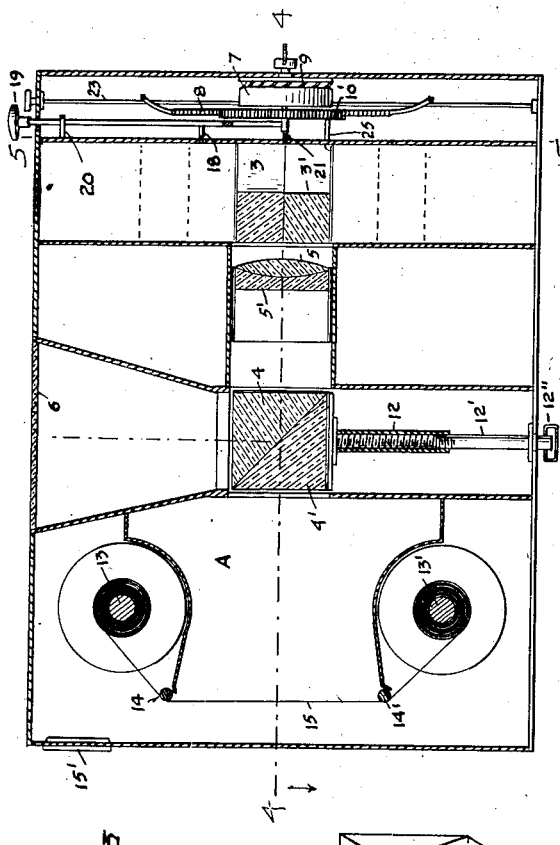
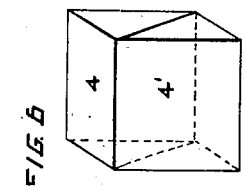
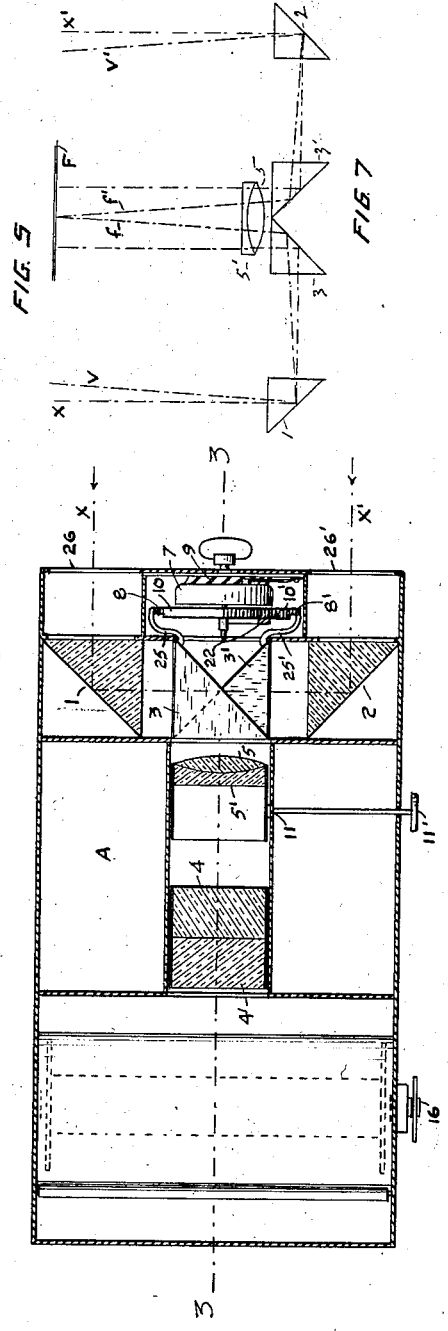
INVENTOR
Graves Griffith.

UNITED STATES PATENT OFFICE.

GRAVES GRIFFITH, OF SAN FRANCISCO, CALIFORNIA.

OPTICAL DEVICE FOR THE PRODUCTION AND PROJECTION OF STEREOSCOPIC PICTURES.

1,334,532.     Specification of Letters Patent.     Patented Mar. 23, 1920.

Application filed November 4, 1919. Serial No. 335,610.

*To all whom it may concern:*

Be it known that I, GRAVES GRIFFITH, a citizen of the United States, residing in the city and county of San Francisco and State of California, have invented certain new and useful Improvements in Optical Devices for the Production and Projection of Stereoscopic Pictures, of which the following is a specification.

The present invention relates to optical devices for producing and projecting successive pictures of moving objects taken from spaced view points.

Broadly, the object of the present device is the production of stereoscopic images of such character that their positives, when projected, will possess all the characteristics of an object as presented to the natural eye.

In all moving picture devices, whatever the type or purpose, the practice, heretofore, has been to provide an interval for film movement, followed by a rest interval during which exposure took place and throughout which all parts, optical included, remained in a state of rest. In my present device, this procedure is departed from, in that the exposure interval is confined to, dependent upon and conterminous with that of the transition of an intermediate reflective combination across the field of view as reflected by spaced reflectors, a procedure, obviously, rendering unnecessary the inclusion of a shutter for the exclusion of light rays from the objective, since the act of transition of itself "makes and breaks" the passage for the transmission of light. Furthermore, the act of transition of this intermediate reflective element permits the utilization of the full lens aperture and the covering of the field fully by each of the two optical halves constituting the optical system, thereby producing two complete images of the field, rather than half-images as results with this intermediate reflective element in a state of rest. There is also incorporated, as an integral part of the optical system, a prism element for separating or dividing the light-rays after their passage through the objective, diverting a portion of them in a direction permitting continuous observation of an image-field resembling in all particulars the one transmitted to the sensitized medium by the remaining portion of these light-rays, an accomplishment not possible with any other device with like purpose, as at present constructed. It is apparent that, inasmuch as these two divisions of light-rays are equal, both as to volume and value, they are also interchangeable relative to designated functions. The prism element for this separation of light-rays is positioned to the rear of the objective and in the path of the light-rays after their passage therethrough, and is comprised of two ninety degree prisms having their hypotenusal surfaces juxtaposed but separated by an air-space. The front prism of this combination prism element reflects a portion of the light-rays received by it in a direction, as stated, enabling the image thus conveyed to be under continuous observation, while that portion passing through it is slightly refracted and then received by the second prism of the combination by which, after undergoing a second and slight refraction, it is transmitted to the sensitized medium. Obviously, these two refractions being in opposite directions and of common refraction index, the one serves to neutralize the other, thus causing these light-rays to retain substantially the same line of direction as at entrance.

In the accompanying drawings, forming a part of this specification, similar parts are referred to by like reference characters, throughout.

Figure 2:
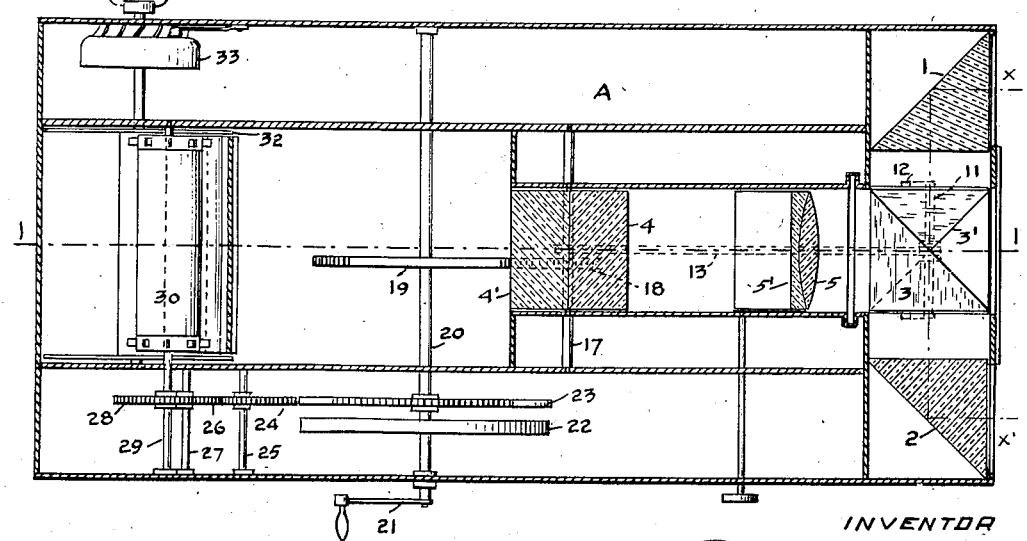

Figure 1 is a longitudinal sectional view partly sectioned, on the line 1—1 of Fig. 2, showing the arrangement of the optical system and that of the mechanical means for the actuation of certain elements to be later more fully explained. Fig. 2 is a horizontal view on the line 2—2 of Fig. 1, showing the optical system and operating mechanism. Fig. 3 is a longitudinal vertical section of a modified form of the device, on the line 3—3 of Fig. 4, showing the optical system, the actuating means for the movable features, and the arrangement for film control. Fig. 4 is a horizontal section on the line 4—4 of Fig. 3, showing the arrangement of the optical features and a mechanism for the actuation of one of the optical elements. Fig. 5 is a front elevation, showing a part of the operating mechanism and the manner of its control. Fig. 6 is a perspective view of the prism combination for the separation of light-rays. Fig. 7 is a diagrammatic plan view of the optical elements, showing a modification in which certain of these elements are reversed, as to direction of operation.

Referring more particularly to the drawings, A represents the casing of the device in which are housed the optical system and the mechanism necessary to the synchronized actuation of certain of the parts.

The optical system comprises spaced reflecting elements 1 and 2 for directing light-rays toward an intermediate point, superposed reflecting elements 3, 3' arranged for transit across the reflected field of view and for coöperation, while in transit, with an objective 5, 5', a ray-dividing prism combination 4, 4' for separating the light-rays as received from the objective 5, 5' into two parts, a reflecting and ocular combination 6 and 7, 7' for conveying one portion of the light-rays thus divided to the eye of an observer, and a sensitized medium properly positioned to receive actinic action from the remaining portion of these divided light-rays.

The mechanism for advancing sections of sensitized medium into operative position, and for controlling the transition of the reflecting elements 3, 3' across the reflected field comprises a main shaft 20, having a means 21 for its actuation, bearing a balance-wheel 22 and mutilated gear-wheels 19 and 23. The latter of these, 23, operates, intermittently, a chain of gear-wheels 24, 26, 28 borne on shafts 25, 27, 29 for the actuation of a sprocket-drum 30 over which passes the film or sensitized medium 31. The supply and take-up reels are of the usual form and are secured after the usual manner, the latter of these reels being provided with a tension spring 33, Fig. 2, insuring the uptake of the slack in the film. The other of these mutilated gear-wheels, 19, operates, also intermittently but in opposite phase, the gear-wheel 18 borne by the shaft 17 which also bears an eccentric 16 playing in a yoke 15 forming one extremity of the rod 13. The rod 13 is pivotally secured at 14 and bears at its other extremity a pivotally secured 11 member 10 whose other extremity 9 is similarly secured to the base of the mounting of the reflecting elements 3, 3', an arc-shaped guide 12 being provided for this member to prevent lateral deviation in its reciprocating movement.

In the modification, as presented in Figs. 3, 4 and 5, the optical system remains that as shown in Figs. 1 and 2, excepting that a ground-glass 6 has been substituted for the reflecting and ocular combination 6, 7, 7', and a means 12, 12', 12'' provided for the withdrawal, when desired, of the light-separating prism element 4, 4' from the light-ray path, in addition to the provision of the usual rack and pinion 11, 11' arrangement for focusing the objective. The film 15 is secured and paid-out, in the usual manner, from a spool 13 over rollers 14, 14' to a take-up spool 13', the rotation of the latter being effected through a means 16. An observation opening, properly protected, is provided at 15', through which film movement may be observed.

The mechanism, for imparting transition movement to the reflecting elements 3, 3' and for the control thereof, comprises a shaft 21 actuated by a spring motor 7 having the usual key-wind and ratchet control 9 and bearing a mutilated pinion 10, 10' engaging, alternately, connected parallel racks 8, 8', for changing rotary into reciprocating motion, a semi-circular stop 22 carried by 10, 10' and concentric with the toothed portion thereof, a lever 19 pivoted at 18 and bearing a semi-circular escapement 17, 17' having abutments 27, 27' for alternate engagement with an end of the semi-circular stop 22, thus restricting the rotation of the pinion 10, 10' by which it is borne to a half-revolution for any one of the operative intervals, a notched member 20 for retaining the lever 19 in any particular position to which it may be shifted, and members 25, 25' for joining the rack-bars 8, 8' to the mountings carrying the reflecting elements 3, 3'. An additional means is also provided for arresting and holding in mid-transit the reflecting elements 3, 3', permitting observation of image in focusing, comprising a rod 23 rotatably secured and bearing a stop 23' for engagement with a stop 24 carried midway on the rack-bar 8, a part turn in an opposite direction clearing them from contact and rendering them inoperative.

In the modification in arrangement of certain of the optical parts shown diagrammatically in Fig. 7, the reflecting elements 3, 3' are spaced and reversed as to reflecting surfaces, with the objective 5, 5' placed beyond instead of to their rear, and a like position assigned to the film F relative to the objective 5, 5'. Infinite rays are here represented by X, X' and the finite by V, V', the final reflected courses of the latter being indicated by f, f' and as intersecting at a point on film F.

While the device as a stereoscopic apparatus for taking pictures has been more particularly kept in view, it is quite obvious that its conversion into a projection means is one of simple and ready accomplishment, and that, either as a taking or projecting means, it may as simply and readily be applied to any of the present type devices for either purpose.

Though the interval for film movement is to the interval for exposure as 1 to 1, as shown in Figs. 1 and 2, they may be made to conform to the usual ratio between these intervals, as in present practice in projection, by a proper alteration in gear arrangement.

As is obvious, the reflecting elements 3, 3', Figs. 1 and 2, are in mid-transit, the result of a one-eighth revolution of the shaft 20, and that a complete transit of these elements results twice, one in either direction, upon each rotation of this shaft, and that two rest intervals also occur during this period of rotation, one following each transition, and that only during these transition intervals are the light-rays, as reflected by the spaced reflectors, 1 and 2, directed into the objective 5, 5′. It is equally obvious, that, during the rest interval following a transition of reflecting elements 3, 3′, 23 is operating through its connecting gear, to bring a section of film into position for exposure, and that these film movements alternate with the transit movements of elements 3. 3′.

In the modification, Fig. 3, 4 and 5, intended more particularly for single exposures, the film sections for exposure are supplied after the usual manner of film kodaks. Preliminary to exposure, the reflecting elements are in one or the other of the dotted-in positions, in which they are maintained through the action of one or the other of the abutments 27, 27′ resting against an end of 22, thus locking against the spring action of 7. Upon the release of this locking means, through a shifting of the lever 19, the spring, through its action upon the shaft 21, revolves the pinion 10, 10′ through a half-revolution, where it is checked and held by one or the other of the abutments 27, 27′. This semi-revolution of the pinion 10, 10′ reciprocates the rack-bars 8, 8′, in one direction equal in distance to the semi-circumference of the pinion, carrying with them the connected reflecting elements 3, 3′ in transit across the paths of the light-rays as reflected by the spaced reflectors 1 and 2, a second release of the locking mechanism resulting in a movement of these parts in the opposite direction. Here, too, as in the previous case, exposure is effected only during the transition of the reflecting elements 3, 3′ across the paths of the light-rays as reflected by reflecting elements 1 and 2, the completion of this act of transition serving, as previously stated, to shut off, automatically, the entrance of light-rays to the objective 5, 5′. While the act of transition of the reflecting elements 3, 3′ is confined, in Figs. 1, 2, 3 and 4, to a plane at right angles to that of the principal plane of reflection of the reflecting elements 1 and 2, it is not the purpose to so confine this act in the arrangement shown in the modification, Fig. 7, as it is apparent that the reflecting elements 3, 3′ may be arranged in the same plane as are the spaced reflectors 1 and 2, and equally apparent that their transition may also occur in that plane.

Light-openings leading interiorly to the respective spaced reflecting elements 1 and 2 are shown at 26 and 26′.

The angular inclination of the hypotenusal faces of 4, 4′ and 6 would, in practice, be such as would best meet requirements.

I claim:

1. In combination, in a stereoscopic picture producing and projecting device of the character described, spaced and oppositely disposed initial ray-reflecting elements, oppositely disposed transitional reflecting elements intermediate the said spaced reflecting elements and arranged for respective coöperation therewith during the period of transition only, means for moving in transit the said intermediate reflecting elements across the paths of the light-rays as reflected by the said spaced reflectors, and means for holding temporarily at rest the said intermediate reflecting elements upon completion of each act of said transition.

2. In combination, in a stereoscopic picture producing and projecting device of the character described, spaced and oppositely disposed initial ray-reflecting elements, oppositely disposed transitional reflecting elements intermediate the said spaced reflecting elements and arranged for respective cooperation therewith during the period of transition only, means for moving in transit the said intermediate reflecting elements across the paths of the light-rays as reflected by the said spaced reflectors, means for holding temporarily at rest the said intermediate reflecting elements upon completion of each act of said transition, and an objective into which the light-rays are directed by the said intermediate reflecting elements during the act of their transition across the paths of the said light-rays as reflected by the said initial ray-receiving elements.

3. In combination, in a stereoscopic picture producing and projecting device of the character described, spaced and oppositely disposed initial ray-reflecting elements, oppositely disposed transitional reflecting elements intermediate the said spaced reflecting elements and arranged for respective cooperation therewith during the period of transition only, means for moving in transit the said intermediate reflecting elements across the paths of the light-rays as reflected by the said spaced reflectors, means for holding temporarily at rest the said intermediate reflecting elements upon completion of each of said transition acts, an objective into which the light-rays are directed by the said intermediate reflecting elements during the act of their transition across the paths of the said light-rays as reflected by the said initial ray-receiving elements, and a means, correlated as to movement with that of the said intermediate reflecting element, for the progressive supply of a sensitized medium as exposed.

4. In combination, in a stereoscopic picture producing and projecting device of the character described, spaced and oppositely disposed initial ray-reflecting elements, oppositely disposed transitional reflecting elements intermediate the said spaced reflecting elements and arranged for respective coöperation therewith during the period of transition only, means for moving in transit the said intermediate reflecting elements across the paths of the light-rays as reflected by the said spaced reflectors, means for holding temporarily at rest the said intermediate reflecting elements upon completion of each of said acts of transition, an objective into which the light-rays are directed by the said intermediate reflecting elements during the act of their transition across the paths of the said light-rays as reflected by the said initial ray-receiving elements, a means for the intermittent and progressive movement of sections of a sensitized medium into position for exposure, the said movement being correlated relative to the said transitory movement of the said intermediate reflecting elements, and a common means for the actuation of both the said means for the movement of the said sensitized medium and the said means governing the transition movement of the said intermediate reflecting elements.

5. In combination, in a stereoscopic picture producing and projecting device of the character described, spaced reflecting elements arranged to reflect light-rays toward a point intermediate the said spaced reflecting elements, a combination reflecting element, comprised of units of reflection oppositely disposed and arranged for respective coöperation therewith during the period only of transition across the paths of the light-rays as reflected by the said spaced reflecting elements, an actuating means for producing the said periodic transit of the said combination reflecting element, an objective for the reception of the light-rays directed thereto by the said intermediate reflecting elements while in passage across the paths of the light-rays as reflected by the said initial ray-receiving elements, and a prism element, comprised of prisms with juxtaposed hypotenusal surfaces and an intervening air-space, for receiving and dividing the light-rays transmitted by the said objective.

6. In combination, in a stereoscopic picture producing and projecting device of the character described, spaced reflecting elements arranged to reflect light-rays toward a point intermediate the said spaced reflecting elements, a combination reflecting element, comprised of units of reflection oppositely disposed and arranged for periodic transit across the paths of the light-rays as reflected by the said spaced reflecting elements, an actuating means for producing the said periodic transit of the said combination reflecting element, an objective for the reception and projection of the light-rays directed thereto by the said intermediate reflecting elements while in passage across the paths of the light-rays as reflected by the said initial ray-receiving elements, a prism element, comprised of prism elements having juxtaposed hypotenusal surfaces with an air-space therebetween, for receiving and dividing the light-rays as projected by the said objective, and means for moving a sensitized medium into position for exposure to the action of the light-rays as received and refracted by the said prism element during the passage of the said intermediate reflecting elements across the paths of the light-rays after their reflection by the said initial ray-receiving elements.

7. In combination, in a stereoscopic picture producing and projecting device of the character described, spaced reflecting elements arranged to reflect light-rays toward a point intermediate the said spaced reflecting elements, a combination reflecting element, comprised of oppositely disposed reflecting members, arranged for periodic transit across the paths of the light-rays as reflected by the said spaced reflecting elements, an actuating means for producing the said periodic transit of the said combination reflecting element across the paths of the said light-rays as reflected by the said spaced reflectors, an objective into which the light-rays are directed by the said intermediate reflecting elements while in passage across the paths of these rays after their initial reflection by the said spaced reflectors, a prism element, comprised of prisms having juxtaposed hypotenusal surfaces with an air-space therebetween, for receiving and dividing the light-rays received and as projected by the said objective, actuating means whereby the successive sections of a sensitized medium are brought into position for exposure to the action of the said light-rays during the period of transition of the said intermediate reflecting elements across the paths of the light-rays as reflected by the said spaced reflectors, means for the continuous observation of images formed by the light-rays as received and reflected by the said prism element, and means for rendering, at will, operative or inoperative the said prism element.

GRAVES GRIFFITH.